United States Patent
Shimakawa et al.

(10) Patent No.: US 11,927,805 B2
(45) Date of Patent: Mar. 12, 2024

(54) OPTICAL FIBER CONNECTION STRUCTURE

(71) Applicant: SUMITOMO ELECTRIC INDUSTRIES, LTD., Osaka (JP)

(72) Inventors: Osamu Shimakawa, Osaka (JP); Hidehisa Tazawa, Osaka (JP); Masato Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/927,815

(22) PCT Filed: May 28, 2021

(86) PCT No.: PCT/JP2021/020507
§ 371 (c)(1),
(2) Date: Nov. 25, 2022

(87) PCT Pub. No.: WO2022/004219
PCT Pub. Date: Jan. 6, 2022

(65) Prior Publication Data
US 2023/0228947 A1 Jul. 20, 2023

(30) Foreign Application Priority Data
Jun. 29, 2020 (JP) .................................. 2020-111739

(51) Int. Cl.
G02B 6/32 (2006.01)
G02B 6/38 (2006.01)

(52) U.S. Cl.
CPC ............ *G02B 6/32* (2013.01); *G02B 6/3853* (2013.01); *G02B 6/3874* (2013.01);
(Continued)

(58) Field of Classification Search
CPC ........ G02B 6/32; G02B 6/327; G02B 6/3845; G02B 6/3853; G02B 6/3874; G02B 6/3885
See application file for complete search history.

(56) References Cited

U.S. PATENT DOCUMENTS 5,652,814 A 7/1997 Pan et al.
6,019,522 A * 2/2000 Kim ..................... G02B 6/32
385/38

(Continued)

FOREIGN PATENT DOCUMENTS

CN 111290075 A 6/2020
JP H09-61683 A 3/1997
(Continued)

OTHER PUBLICATIONS

Yusaku Tottori et al., "Invited lecture Multi-core fiber connection technology by spacial coupling", IEICE Technical Report, Feb. 2013 pp. 17-23.
(Continued)

*Primary Examiner* — Ryan A Lepisto
(74) *Attorney, Agent, or Firm* — Oliff PLC

(57) ABSTRACT

An optical fiber connection structure includes: a tubular member; a first collimator attached to a first end of the tubular member in an axial direction; and a second collimator attached to a second end of the tubular member. The first collimator includes a first optical fiber, a first ferrule, a first lens, and a first sleeve. The second collimator includes a second optical fiber, a second ferrule terminating the second optical fiber, a second lens, and a second sleeve. The first sleeve is fixed to the first end via adhesive in a state where the first lens faces the tubular member, and the second sleeve is fixed to the second end via adhesive in a state where the
(Continued)

second lens faces the tubular member. An outer diameter of the second ferrule is larger than that of the second lens.

11 Claims, 16 Drawing Sheets

(52) U.S. Cl.
CPC ............ *G02B 6/3885* (2013.01); *G02B 6/327* (2013.01); *G02B 6/3845* (2013.01)

(56) References Cited

U.S. PATENT DOCUMENTS

| | | | | |
|---|---|---|---|---|
| 6,454,465 | B1* | 9/2002 | Uschitsky | G02B 6/29364 |
| | | | | 385/47 |
| 6,556,733 | B2* | 4/2003 | Dy | G02B 6/2746 |
| | | | | 385/11 |
| 6,701,040 | B2* | 3/2004 | Li | G02B 6/2938 |
| | | | | 385/47 |
| 6,768,823 | B2* | 7/2004 | Zhou | G02B 6/2746 |
| | | | | 385/11 |
| 7,194,160 | B2* | 3/2007 | Tanaka | G02B 6/2938 |
| | | | | 385/39 |
| 7,672,551 | B2* | 3/2010 | Ji | G02B 6/322 |
| | | | | 385/47 |
| 8,873,909 | B1* | 10/2014 | Wang | G02B 6/2937 |
| | | | | 385/33 |
| 2003/0138215 | A1* | 7/2003 | Zhou | G02B 6/2938 |
| | | | | 385/74 |
| 2003/0185519 | A1* | 10/2003 | Ushinsky | G02B 6/2937 |
| | | | | 385/60 |
| 2007/0165981 | A1 | 7/2007 | Tanaka et al. | |
| 2010/0238559 | A1 | 9/2010 | Tanaka | |
| 2012/0020618 | A1 | 1/2012 | Erdman et al. | |
| 2013/0330039 | A1* | 12/2013 | Liu | G02B 6/28 |
| | | | | 385/33 |
| 2019/0154925 | A1 | 5/2019 | Kondo et al. | |

FOREIGN PATENT DOCUMENTS

| | | |
|---|---|---|
| JP | 2003-167159 A | 6/2003 |
| JP | 2006-323421 A | 11/2006 |
| JP | 2007-193006 A | 8/2007 |
| JP | 2009-145427 A | 7/2009 |
| JP | 2013/182222 A | 9/2013 |
| JP | 2016-61941 A | 4/2016 |
| JP | 2016-224183 A | 12/2016 |
| JP | 2018-136551 A | 8/2018 |
| WO | 2009/075168 A1 | 6/2009 |
| WO | 2016/189882 A1 | 12/2016 |

OTHER PUBLICATIONS

Tetsuya Kobayashi et al., "Multi-core fiber coupling devices using free space optics and their possible application to other functions", IEICE Technical Report, Feb. 2014, pp. 35-40.

Yusaku Tottori et al., "Study of miniaturization of fan-in/fan-out devices using free space optics", IEICE Technical Report, Feb. 2015, pp. 113-116.

* cited by examiner

OPTICAL FIBER CONNECTION STRUCTURE

TECHNICAL FIELD

The present disclosure relates to an optical fiber connection structure.

This application is based upon and claims the benefit of priority from Japanese Patent Application No. 2020-111739, filed on Jun. 29, 2020, the entire contents of which are incorporated herein by reference.

BACKGROUND ART

Patent Literature 1 describes an optical functional component including a collimator. The collimator includes a lens and a ferrule terminating an optical fiber. The optical functional component includes a cylindrical tube internally holding a pair of collimators so that a pair of lenses face each other. A WDM (Wavelength Division Multiplexing) filter or an isolator is arranged between the pair of lenses inside the cylindrical tube.

Patent Literature 2 discloses a lens type device including an optical functional component such as an isolator. The lens type device has a tubular member. A pair of lenses and a Faraday element arranged between the pair of lenses are arranged inside the tubular member.

Patent Literature 3 describes an optical isolator device. The optical isolator device includes a tubular member made of a metal, an optical isolator arranged inside the tubular member, and a pair of collimators fixed to the tubular member. The collimator has a ferrule terminating an optical fiber and a lens that is optically coupled with the isolator. Each collimator is fixed to the tubular member by spot welding.

CITATION LIST

Patent Literature

Patent Literature 1: U.S. Pat. No. 5,652,814
Patent Literature 2: International Publication WO 2009/075168
Patent Literature 3: Japanese Unexamined Patent Publication No. H9-61683

SUMMARY OF INVENTION

An optical fiber connection structure according to the present disclosure includes: a tubular member; a first collimator attached to a first end in an axial direction in which an axial line of the tubular member extends; and a second collimator attached to a second end on a side opposite to the first end of the tubular member. The first collimator includes a first optical fiber, a first ferrule terminating the first optical fiber, a first lens facing the first ferrule through a gap, and a first sleeve internally holding the first lens and the first ferrule. The second collimator includes a second optical fiber, a second ferrule terminating the second optical fiber, a second lens facing the second ferrule through a gap, and a second sleeve internally holding the second lens and the second ferrule. An outer face of the first ferrule and an inner face of the first sleeve are fixed to each other via adhesive, an outer face of the first lens and the inner face of the first sleeve are fixed to each other via adhesive, an outer face of the second lens and an inner face of the tubular member are fixed to each other via adhesive, and an outer face of the second ferrule and an inner face of the second sleeve are fixed to each other via adhesive. The first sleeve is fixed to the first end in a state where the first lens faces the tubular member, and the second sleeve is fixed to the second end in a state where the second lens enters the tubular member. An outer diameter of the second ferrule is larger than that of the second lens.

DESCRIPTION OF EMBODIMENTS

Figure 1:
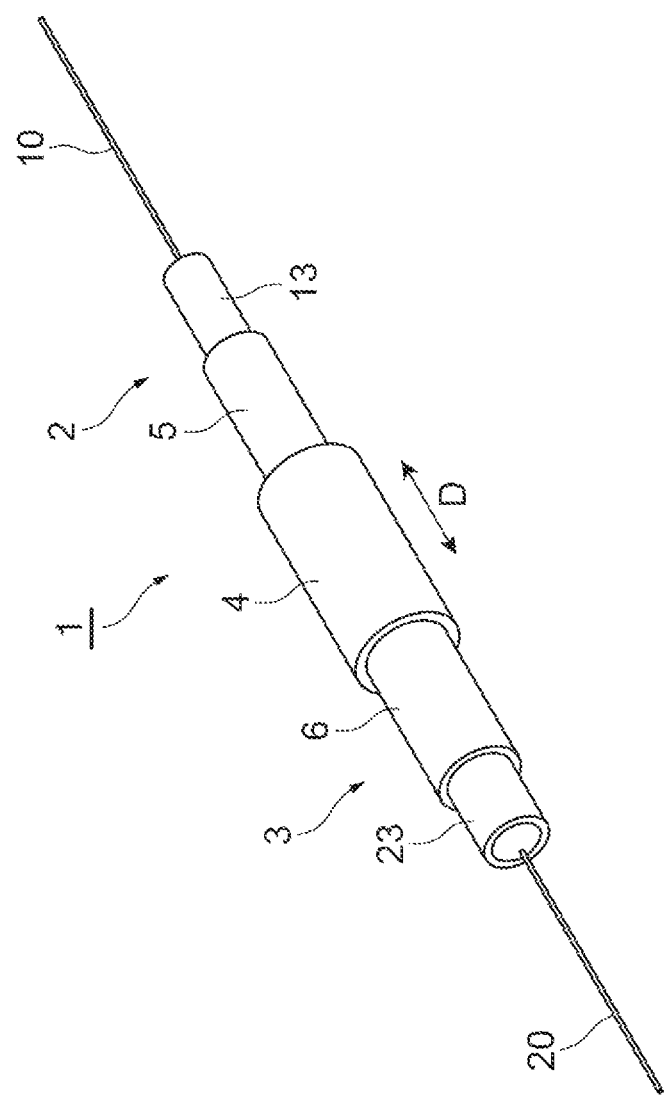
FIG. 1 is a perspective view illustrating an optical fiber connection structure according to an embodiment.

In an optical fiber connection structure, when a ferrule is fixed to a tubular member with adhesive in a state where the ferrule enters the tubular member, the ferrule may be inclined due to changes in the environment such as temperature and humidity depending on a thickness of the adhesive. In this case, there is a possibility that reliability of optical connection may decrease. In addition, in a case of fixing a collimator to the tubular member made of a metal by welding, since advanced welding technique is required and various tools for welding are required, fixing of the collimator may not be easily performed.

An object of the present disclosure is to provide an optical fiber connection structure capable of easily perform fixing of a collimator and improve reliability of optical connection.

According to the present disclosure, fixing of a collimator can be easily performed, and reliability of optical connection can be improved.

DESCRIPTION OF EMBODIMENTS OF THE PRESENT DISCLOSURE

First, contents of embodiments of the present disclosure are listed and described. An optical fiber connection structure according to one embodiment includes: a tubular member, a first collimator attached to a first end in an axial direction, which is a direction in which an axial line of the tubular member extends, and a second collimator attached to a second end on a side opposite to the first end of the tubular member. The first collimator includes a first optical fiber, a first ferrule terminating the first optical fiber, a first lens facing the first ferrule through a gap, and a first sleeve internally holding the first lens and the first ferrule. The second collimator includes a second optical fiber, a second ferrule terminating the second optical fiber, a second lens facing the second ferrule through a gap, and a second sleeve internally holding the second lens and the second ferrule. An outer face of the first ferrule and an inner face of the first sleeve are fixed to each other via adhesive, an outer face of the first lens and the inner face of the first sleeve are fixed to each other via adhesive, an outer face of the second lens and an inner face of the tubular member are fixed to each other via adhesive, and an outer face of the second ferrule and an inner face of the second sleeve are fixed to each other via adhesive. The first sleeve is fixed to the first end in a state where the first lens faces the tubular member, and the second sleeve is fixed to the second end in a state where the second lens enters the tubular member. An outer diameter of the second ferrule is larger than that of the second lens.

In this optical fiber connection structure, the first collimator is attached to the first end of the tubular member, and the second collimator is attached to the second end on the side opposite to the first end of the tubular member. The first collimator has the first sleeve, and the first ferrule terminating the first optical fiber and the first lens are retained inside the first sleeve. The second collimator has the second sleeve, and the second ferrule terminating the second optical fiber and the second lens are retained inside the second sleeve. The first sleeve is fixed to the first end in a state where the first lens faces the tubular member, and the second sleeve is fixed to the second end in a state where the second lens enters the tubular member. Therefore, since the first collimator and the second collimator are fixed to the first end and the second end of the tubular member in the axial direction, respectively, the first collimator and the second collimator can be easily fixed to the tubular member. Further, since the first collimator and the second collimator are fixed to the first end and the second end, respectively, the inclination of the ferrule is reduced, so that the reliability of the optical connection can be improved. The outer diameter of the second ferrule of the second collimator is larger than that of the second lens. Therefore, since center-aligning of the second ferrule in the direction perpendicular to the optical axis of the second lens can be performed in a state where the second lens is fixed to the tubular member, the center-aligning and the assembling of the parts can be easily performed.

The end portion of the first sleeve and the first end of the tubular member may be fixed via adhesive, and the end portion of the second sleeve and the second end of the tubular member may be fixed via adhesive. The inclination of the first sleeve and the tubular member and the inclination of the second sleeve and the tubular member can be reduced, and the reliability of the optical connection can be improved.

The first lens may have an end face facing the first ferrule. The first ferrule may have an end face facing the first lens. An inclination angle of the end face of the first lens with respect to a plane perpendicular to the axial direction is different from an inclination angle of the end face of the first ferrule with respect to the plane perpendicular to the axial direction, and a light beam may be output from the first lens toward the tubular member along the axial direction. In this case, since the light beam is output along the axial direction of the tubular member, distortion of the beam can be reduced, so that efficiency of the optical coupling can be further improved.

The second lens may have an end face facing the second ferrule. The second ferrule may have an end face facing the second lens. The inclination angle of the end face of the second lens with respect to the plane perpendicular to the axial direction is different from that of the end face of the second ferrule with respect to the plane perpendicular to the axial direction, and the light beam may be output from the second lens toward the tubular member along the axial direction. In this case, as described above, the distortion of the beam can be reduced, so that the efficiency of the optical coupling can be further improved.

An end face of the first lens facing the tubular member may enter an inside of the first sleeve rather than an end face of the first sleeve facing the tubular member. In this case, since the first lens does not protrude from the first sleeve, when the first collimator is center-aligned in the direction perpendicular to the optical axis of the first lens, the first lens can be prevented from interfering with the tubular member. Therefore, the center-aligning and the fixing of the first collimator can be easily performed.

At least one of the end face of the first lens facing the tubular member and the end face of the second lens entering the tubular member may be spherical. Further, at least one of the first lens and the second lens may be a GRIN lens.

The optical fiber connection structure described above may include a Faraday element arranged inside the tubular member. In this case, the optical fiber connection structure can be used as an optical isolator.

The first optical fiber may be a multi-core fiber. The second optical fiber may be a plurality of single-core fibers. Each of the plurality of single-core fibers may have a beam expansion portion capable of expanding a mode field diameter of a light beam propagating in the core of the single-core fiber. In this case, the optical fiber connection structure is used as a fan-in/fan-out device for multi-core fibers.

Any one of the first optical fiber or the second optical fiber may be a two-core optical fiber. The optical fiber connection structure may include a WDM filter arranged inside the tubular member. In this case, the optical fiber connection structure can be a WDM multiplexing/demultiplexing device.

A maximum thickness of the adhesive may be 50 μm or less. In this case, since the maximum thickness of the adhesive can be reduced to 50 μm or less, the fixing of the collimator can be more easily performed, and the reliability of the optical connection can be further improved.

DETAILS OF EMBODIMENTS OF THE PRESENT DISCLOSURE

Specific examples of the optical fiber connection structure of the present disclosure are described below with reference to the drawings. It is noted that the present invention is not limited to the examples described later, but is indicated by the scope of the claim, and is intended to include all modified examples within the scope of the claims and the scope equivalent thereto. In the description of the drawings, the same or corresponding elements are denoted by the same reference numerals, and duplicate description is omitted as appropriate. The drawings may be partially simplified or exaggerated for ease of the understanding, and dimensional ratios and angles are not limited to those of the drawings.

Figure 2:
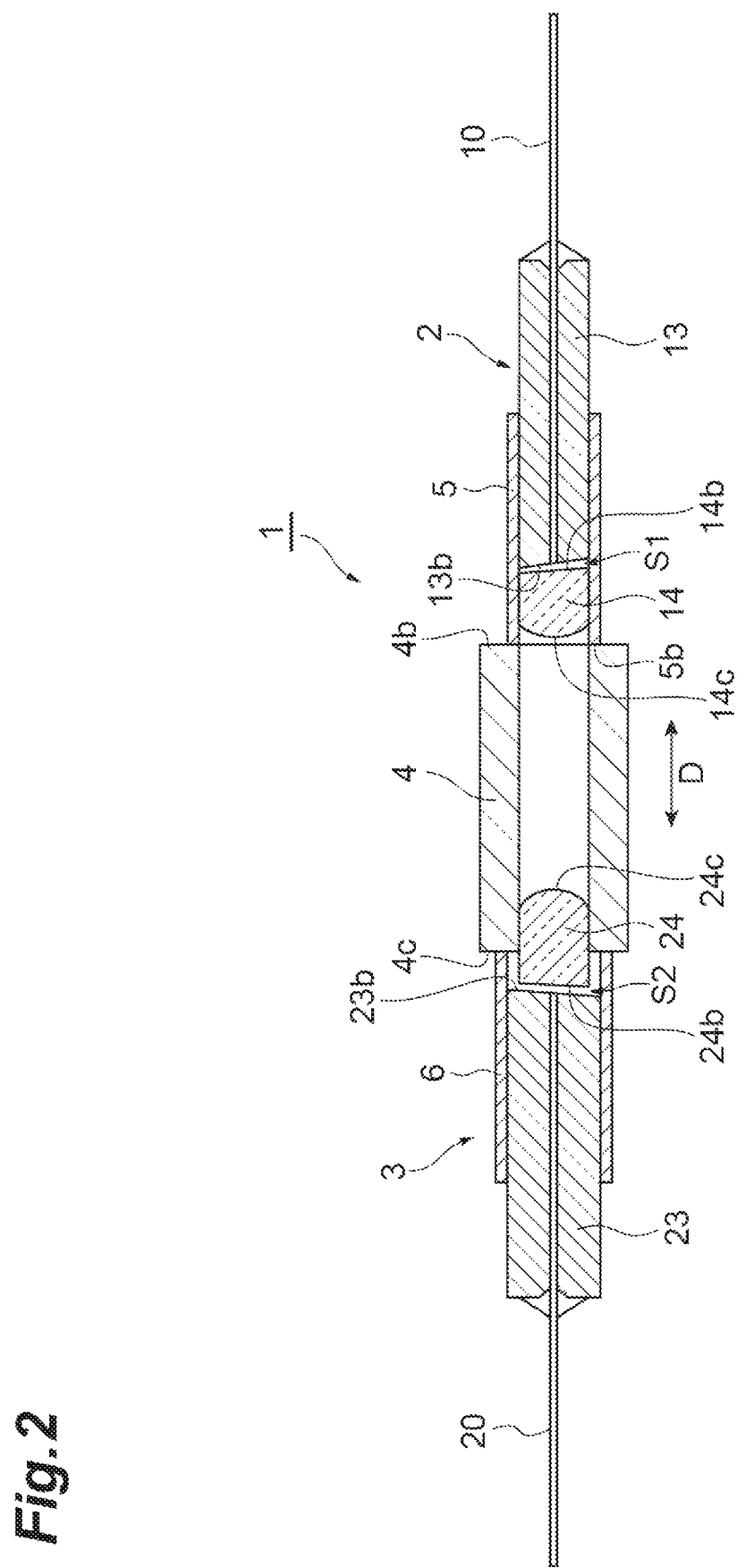
FIG. 2 is a cross-sectional view of the optical fiber connection structure of FIG. 1.

FIG. 1 is a perspective view illustrating an optical fiber connection structure 1 according to an embodiment. FIG. 2 is a cross-sectional view illustrating the optical fiber connection structure 1. As illustrated in FIGS. 1 and 2, the optical fiber connection structure 1 includes a first collimator 2, a second collimator 3, and a tubular member 4. The first collimator 2 has a first optical fiber 10, a first ferrule 13, a first lens 14, and a first sleeve 5. The second collimator 3 has a second optical fiber 20, a second ferrule 23, a second lens 24 and a second sleeve 6. The tubular member 4 connects the first collimator 2 and the second collimator 3 to each other. The tubular member 4 is made of, for example, glass.

The first collimator 2 is attached to a first end 4b in an axial direction D, which is a direction in which an axial line of the tubular member 4 extends. The first sleeve 5 of the first collimator 2 is fixed to the first end 4b, and adhesion and various other fixing methods can be used. When the adhesive is used, the adhesive is, for example, a UV (ultraviolet) curable adhesive. The first sleeve 5 and the first ferrule 13 are made of, for example, glass. When the tubular member 4 and the first sleeve 5 are made of glass and the first sleeve 5 is fixed to the tubular member 4 with the UV curable adhesive, a difference in linear expansion coefficient between the tubular member 4 and the first sleeve 5 can be allowed to be small, the reliability of the connection can be improved.

The first ferrule 13 terminates the first optical fiber 10, and a distal end face of the first optical fiber 10 faces the first lens 14. The first sleeve 5 is fixed to the first end 4b in a state where the first lens 14 faces the tubular member 4. The first lens 14 faces the first ferrule 13 and the first optical fiber 10 via a gap S1. The first sleeve 5 has a tubular shape. The first ferrule 13 and the first lens 14 are held inside the first sleeve 5. An outer face of the first ferrule 13 and an inner face of the first sleeve 5 are fixed via adhesive, and an outer face of the first lens 14 and an inner face of the first sleeve 5 are fixed via adhesive.

The second collimator 3 is attached to a second end 4c on the side opposite to the first end 4b of the tubular member 4. The second sleeve 6 of the second collimator 3 is fixed to, for example, the second end 4c via adhesive, but various other fixing methods can be used. The second ferrule 23 terminates the second optical fiber 20, and a distal end face of the second optical fiber 20 faces the second lens 24. The second sleeve 6 is fixed to the second end 4c in a state where the second lens 24 enters the tubular member 4. The second lens 24 faces the second ferrule 23 and the second optical fiber 20 via a gap S2. The second sleeve 6 has a tubular shape. The second ferrule 23 and the second lens 24 are held inside the second sleeve 6. An outer face of the second ferrule 23 and an inner face of the second sleeve 6 are fixed via adhesive.

The first lens 14 is, for example, a tip spherical rod lens which has an spherical surface on one side and angled flat surface on the other side. An outer diameter of the first lens 14 is substantially the same as an outer diameter of the first ferrule 13. An inner diameter of the first sleeve 5 is slightly larger than the outer diameter of the first lens 14 and the outer diameter of the first ferrule 13. For example, the gap of, for example, 0 µm or more and 20 µm or less is formed between each of outer peripheral surface of the first lens 14 and an outer peripheral surface of the first ferrule 13 and an inner peripheral surface of the first sleeve 5. An end face 14c of the first lens 14 facing the tubular member 4 enters an inside of the first sleeve 5 rather than an end face 5b of the first sleeve 5 facing the tubular member 4. As the result, the first lens 14 can be prevented from interfering with the tubular member 4 when the first collimator 2 is center-aligned in the direction perpendicular to the axial direction D.

For example, the second lens 24 of the second collimator 3 is a tip spherical rod lens which has an spherical surface on one side and angled flat surface on the other side. A portion of the second lens 24 is inserted into an inside of the tubular member 4. An outer diameter of the second lens 24 is slightly smaller than an inner diameter of the tubular member 4, smaller than an outer diameter of the second ferrule 23, and smaller than an inner diameter of the second sleeve 6. An outer diameter of the second ferrule 23 is larger than the inner diameter of the tubular member 4 and slightly smaller than the inner diameter of the second sleeve 6.

Figure 3:
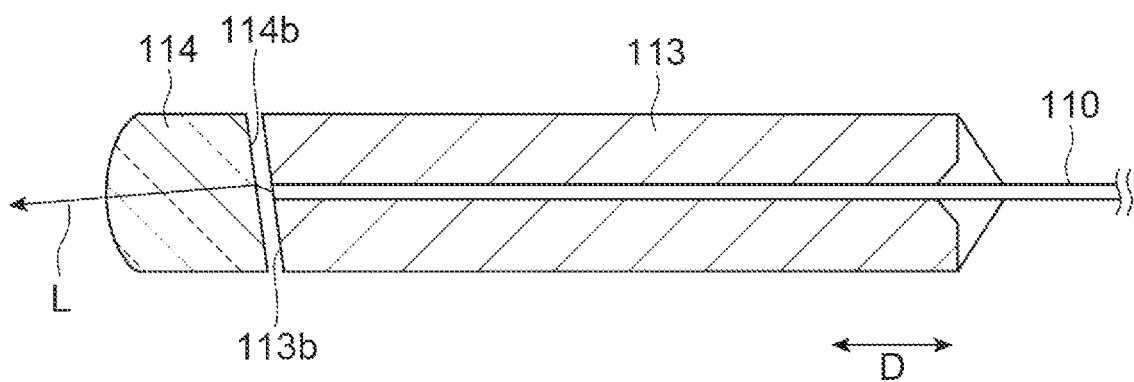
FIG. 3 is a cross-sectional view illustrating a ferrule and a lens of an optical fiber connection structure according to a comparative example.
Figure 4:
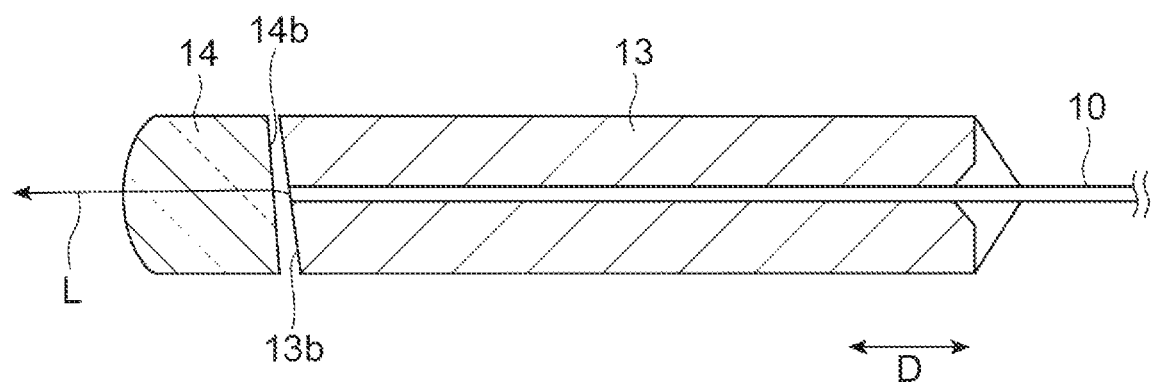
FIG. 4 is a cross-sectional view illustrating a ferrule and a lens of an optical fiber connection structure according to an embodiment.

A length of the gap S1 formed between the first optical fiber 10 (the first ferrule 13) and the first lens 14 in the axial direction D is adjusted so that a light beam output from the first lens 14 toward the second lens 24 becomes a collimated light beam. FIG. 4 is a diagram illustrating the first optical fiber 10, the first ferrule 13 and the first lens 14 according to the embodiment, and FIG. 3 is a diagram illustrating a first optical fiber 110, a first ferrule 113, and a first lens 114 according to a comparative example.

By the way, in some cases, a refractive index of the first lens 114 may be different from a refractive index of the first optical fiber 110 and may be, for example, higher than the refractive index of the first optical fiber 110. At this time, as illustrated in FIG. 3, when an end face 113b (a distal end face of the first optical fiber 110) of the first ferrule 113 facing the first lens 114 and a plane 114b of the first lens 114 facing the first ferrule 113 are parallel to each other, a light beam L output from the first optical fiber 110 is inclined from an optical axial direction (an axial direction D) of the first optical fiber 110 in the first lens 114.

On the other hand, as illustrated in FIGS. 2 and 4, when a first ferrule end face 13b (a distal end face of the first optical fiber 10) of the first ferrule 13 facing the first lens 14 and a first lens end face 14b of the first lens 14 facing the first ferrule 13 are not in parallel to each other, a light beam L output from the first optical fiber 10 is output in parallel to the optical axial direction of the first optical fiber 10 in the first lens 14. As the result, since the light beam L is output from the first lens 14 toward the second lens 24 in parallel to the axial direction D, the optical coupling loss can be reduced. When a refractive index of the first lens 14 is higher than a refractive index of the first optical fiber 10, an inclination angle of the first ferrule end face 13b with respect to a plane perpendicular to the axial direction D is larger than an inclination angle of the first lens end face 14b with respect to the plane perpendicular to the axial direction D. It is noted that a second ferrule end face 23b of the second ferrule 23 facing the second lens 24 and a second lens end face 24b of the second lens 24 facing the second ferrule 23 may not be in parallel to each other. In this case as well, the same functions and effects as those of the first lens 14 and the first ferrule 13 described above can be obtained.

Figure 5:
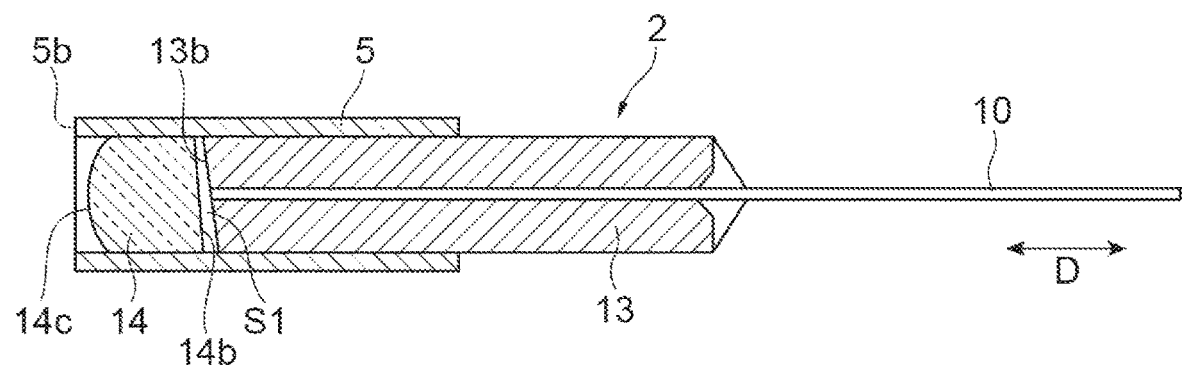
FIG. 5 is a diagram illustrating one step of a method for assembling the optical fiber connection structure according to the embodiment.

Next, an example of a method for assembling the optical fiber connection structure 1 is described. First, as illustrated in FIG. 5, the first sleeve 5 of the first collimator 2, the first ferrule 13 for terminating the first optical fiber 10, and the first lens 14 are prepared. The first lens 14 is inserted into the first sleeve 5, and the first lens 14 inserted into the first sleeve 5 is fixed to the first sleeve 5 with adhesive. At this time, the first lens 14 is inserted into an inside of the first sleeve 5 so that the end face 14c of the first lens 14 does not protrude from the end face 5b of the first sleeve 5.

Then, the first ferrule 13 is inserted into the first sleeve 5. The first ferrule 13 is inserted into the first sleeve 5 from the opposite side of the end face 14c of the first lens 14. At this time, the rotation position of the first ferrule 13 around the first optical fiber 10 is adjusted so that the inclination direction of the first ferrule end face 13b of the first ferrule 13 matches the inclination direction of the first lens end face 14b of the first lens 14. After the first ferrule 13 is inserted into the first sleeve 5, the length of the gap S1 between the first lens 14 and the first ferrule 13 in the axial direction D is adjusted.

Figure 6:
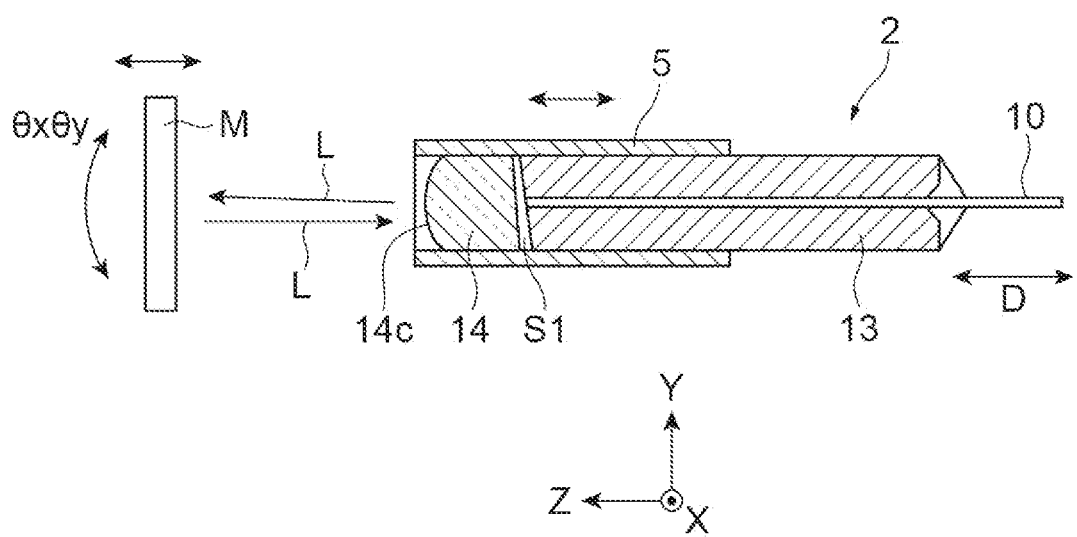
FIG. 6 is a diagram illustrating one step of the method for assembling the optical fiber connection structure according to the embodiment.

For example, as illustrated in FIG. 6, a mirror M is arranged on the side opposite to the first optical fiber 10 of the first sleeve 5. In the above-mentioned adjustment of the gap S1, the mirror M reflects the light beam L output from the first lens 14 through the first optical fiber 10, and while a power of the light beam L reflected by the mirror M and returned to the first optical fiber 10 is detected, the adjustment of the gap S1 is performed. When the direction extending from the first optical fiber 10 along the axial direction D is set to a Z direction, the direction perpendicular to the Z direction is set to an X direction, and the direction perpendicular to both the Z direction and the X direction is set to a Y direction, for example, the mirror M can be inclined in a θx direction around the X direction and in a θy direction around the Y direction.

The gap S1 is adjusted so that the collimated light beam L from the first optical fiber 10 passing through the first lens 14 is reflected by the mirror M and the power of the light beam L returning from the mirror M to the first optical fiber 10 is maximized. Instead of the method of adjusting the gap S1 by using the mirror M, a beam profiler may be arranged at the position facing the end face 14c of the first lens 14, and the gap S1 may be adjusted while observing the light beam L by the beam profiler. In this case, the gap S1 is adjusted so that a beam diameter of the light beam L output from the end face 14c of the first lens 14 becomes a desired beam diameter. After the gap S1 is adjusted as described above, the first ferrule 13 is fixed to the first sleeve 5 with adhesive to complete the first collimator 2.

Figure 7:
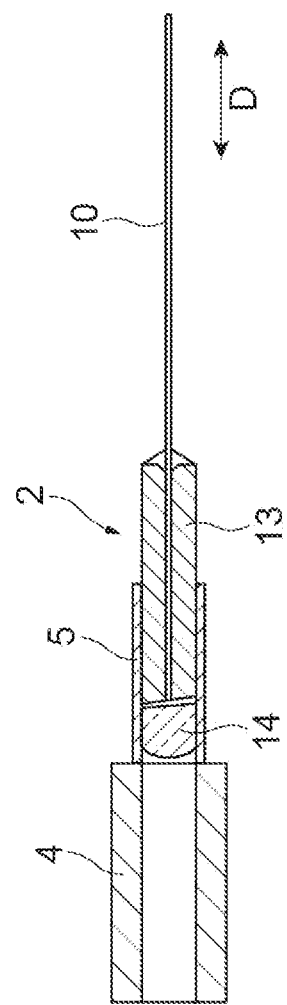
FIG. 7 is a diagram illustrating one step of the method for assembling the optical fiber connection structure according to the embodiment.
Figure 8:
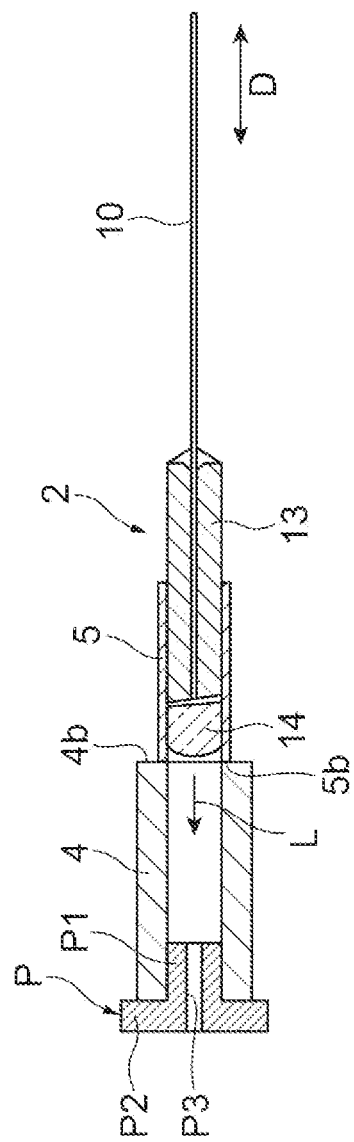
FIG. 8 is a diagram illustrating one step of the method for assembling the optical fiber connection structure according to the embodiment.

As illustrated in FIGS. 7 and 8, the first collimator 2 is fixed to the tubular member 4. At this time, a position of the tubular member 4 and a position of the first sleeve 5 in a direction (an XY direction) perpendicular to the axial direction D are adjusted. That is, the position of the first sleeve 5 with respect to the tubular member 4 in the XY direction is adjusted so that the position of the axis of the tubular member 4 matches the position of the first sleeve 5 on the axial line. The position adjustment of the first sleeve 5 with respect to the tubular member 4 in the XY direction may be performed by a pinhole jig P inserted into the tubular member 4. The pinhole jig P has a tubular insertion portion P1 inserted into the tubular member 4 and a flange portion P2 of which diameter is expanded from the insertion portion P1. The pinhole jig P is formed with a through-hole P3 that penetrates the insertion portion P1 and the flange portion P2 in the axial direction D.

For example, the insertion portion P1 of the pinhole jig P is inserted into the tubular member 4 from the opposite side of the first sleeve 5, and the position of the first sleeve 5 is adjusted so that the light beam L output from the first lens 14 through the first optical fiber 10 passes through the through-hole P3 of the pinhole jig P. After the position of the first sleeve 5 with respect to the tubular member 4 is adjusted so that the light beam L passes through the through-hole P3, the end face 5b of the first sleeve 5 is fixed to the first end 4b of the tubular member 4. After that, the pinhole jig P is removed from the tubular member 4. Through the above steps, the fixing of the first collimator 2 to the tubular member 4 is completed. For fixing the first sleeve 5 and the tubular member 4, adhesion and various other fixing methods can be used.

Figure 9:
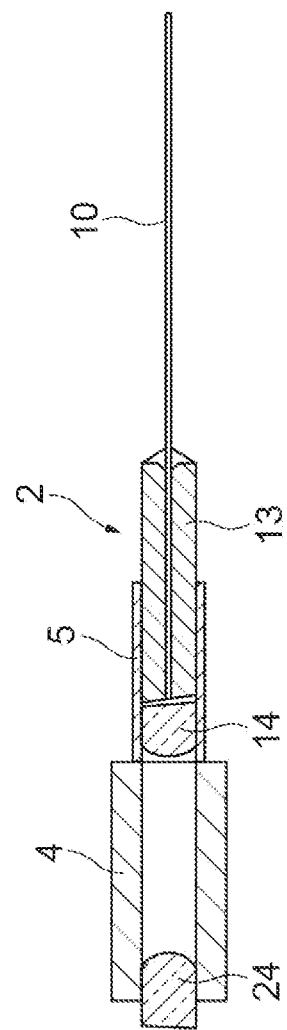
FIG. 9 is a diagram illustrating one step of the method for assembling the optical fiber connection structure according to the embodiment.
Figure 10:
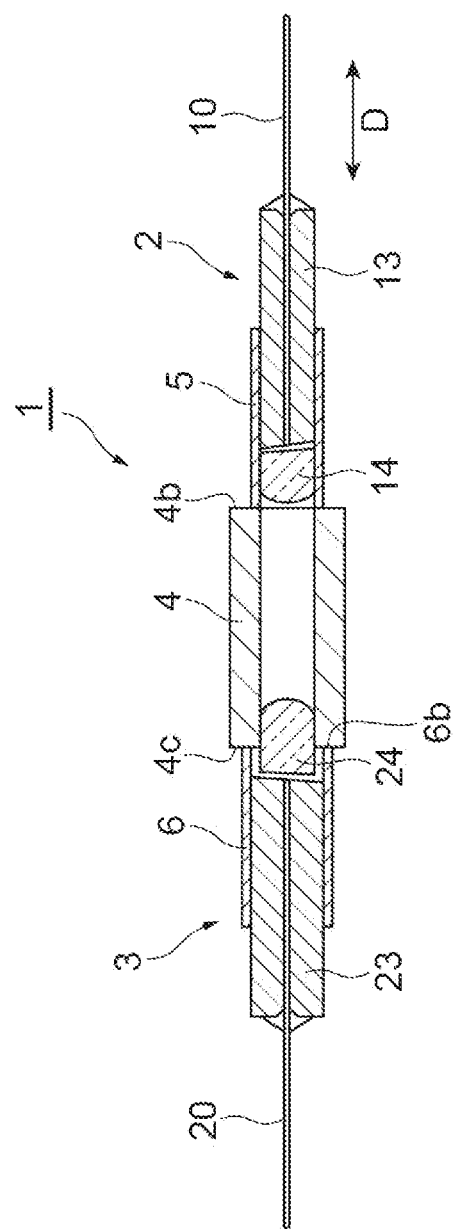
FIG. 10 is a diagram illustrating an optical fiber connection structure according to an embodiment.

Next, as illustrated in FIG. 9, the second lens 24 is inserted into the tubular member 4 from the opposite side of the first collimator 2. At this time, the rotational position of the second lens 24 around the optical axial direction of the first optical fiber 10 is adjusted and fixed via adhesive. Then, as illustrated in FIG. 10, the second sleeve 6 into which the second ferrule 23 is inserted is attached to the second end 4c of the tubular member 4.

At this time, after the second optical fiber 20 is center-aligned with respect to the second lens 24 in the X direction, the Y direction, the Z direction, and the θz direction around the Z direction, the second ferrule 23 is fixed to the second sleeve 6 with adhesive. Then, the second sleeve 6 is center-aligned with respect to the tubular member 4 in the X direction and the Y direction, and after that, an end face 6b of the second sleeve 6 is fixed to the second end 4c of the tubular member 4. For fixing the second sleeve 6 and the tubular member 4, adhesion and various other fixing methods can be used.

The fixing of the second collimator 3 to the tubular member 4 is completed through the above processes. The adhesive is applied between the first sleeve 5 and the first ferrule 13, between the first sleeve and the first lens 14, between the tubular member 4 and the second lens 24, and between the second sleeve 6 and the second ferrule 23. When the adhesive is applied to such a portion, the thickness of the adhesive can be reduced.

The maximum thickness of the adhesive of the optical fiber connection structure 1 is, for example, 50 μm or less. The "maximum thickness of the adhesive" indicates the maximum thickness among the thicknesses of the adhesives applied between the plurality of components for the purpose of fixing the components, which are filled in the gaps between the components. As an example, a lower limit of the maximum thickness of the adhesive is 5 μm. Further, the maximum thickness of the adhesive may be 10 μm or more or 20 μm or more. The maximum thickness of the adhesive may be 40 μm or less or 30 μm or less. As mentioned above, the adhesive is, for example, a UV curable adhesive. However, the adhesive may be any adhesive other than the UV curable type and may be, for example, a visible light curable adhesive, a heat curable adhesive, or a room temperature curable adhesive.

Next, the functions and effects obtained from the optical fiber connection structure 1 according to the embodiment are described. In the optical fiber connection structure 1, the first collimator 2 is attached to the first end 4b of the tubular member 4, and the second collimator 3 is attached to the second end 4c on the side opposite to the first end 4b of the tubular member 4. The first collimator 2 has the first sleeve 5, and the first ferrule 13 for terminating the first optical fiber 10 and the first lens 14 are held inside the first sleeve 5. The second collimator 3 has the second sleeve 6, and the second ferrule 23 for terminating the second optical fiber 20 and the second lens 24 are held inside the second sleeve 6. The first sleeve 5 is fixed to the first end 4b in a state where the first lens 14 faces the tubular member 4, and the second sleeve 6 is fixed to the second end 4c in a state where the second lens 24 enters the tubular member 4. Therefore, since the first collimator 2 and the second collimator 3 are fixed to the first end 4b and the second end 4c of the tubular member 4 in the axial direction D, respectively, the first collimator 2 and the second collimator 3 can be easily fixed to the tubular member 4. For fixing of the first sleeve 5 and the tubular member 4 and fixing of the second sleeve 6 and the second lens 24, adhesion and various other fixing methods can be used.

Further, since the first collimator 2 and the second collimator 3 are fixed to the first end 4b and the second end 4c, respectively, the inclination of the first ferrule 13 and the second ferrule 23 is reduced, so that the reliability of the optical connection can be improved. The outer diameter of the second ferrule 23 of the second collimator 3 is larger than the outer diameter of the second lens 24. Therefore, since center-aligning of the second ferrule 23 in the direction (the direction perpendicular to the axial direction D) perpendicular to the optical axis of the second lens 24 can be performed in a state where the second lens 24 is fixed to the tubular member 4, center-aligning and assembling of parts can be easily performed.

As illustrated in FIGS. 2 and 4, the first lens 14 has the first lens end face 14b facing the first ferrule 13, and the first ferrule 13 has the first ferrule end face 13b facing the first lens 14. The inclination angle of the first lens end face 14b with respect to the plane perpendicular to the axial direction D may be different from the inclination angle of the first ferrule end face 13b with respect to the plane perpendicular to the axial direction D, and the light beam L is output along the axial direction D from the first lens 14 toward the second lens 24. Therefore, since the light beam L is output along the axial direction D of the tubular member 4, distortion of the beam can be reduced, so that efficiency of the optical coupling can be further improved.

In the present embodiment, the second lens 24 has the second lens end face 24b facing the second ferrule 23, and the second ferrule 23 has the second ferrule end face 23b facing the second lens 24. The inclination angle of the second lens end face 24b with respect to the plane perpendicular to the axial direction D is different from the inclination angle of the second ferrule end face 23b with respect to the plane perpendicular to the axial direction D, and a light beam may be output in the axial direction D from the second lens 24 is toward the first lens 14. In this case, as described above, the distortion of the beam can be reduced, so that the efficiency of the optical coupling can be further improved.

In the present embodiment, the end face 14c of the first lens 14 facing the tubular member 4 enters an inside of the first sleeve 5 rather than the end face 5b of the first sleeve 5 facing the tubular member 4. Therefore, since the first lens 14 does not protrude from the first sleeve the first collimator 2 is center-aligned in the direction (for example, the X direction and the Y direction) perpendicular to the optical axis of the first lens 14, the lens 14 can be prevented from interfering with the tubular member 4. Therefore, the center-aligning and the fixing of the first collimator 2 can be easily performed. Further, at least one of the end face 14c of the first lens 14 facing the tubular member 4 and an end face 24c of the second lens 24 facing the tubular member 4 may be spherical.

In this embodiment, the maximum thickness of the adhesive is 50 μm. Therefore, since the maximum thickness of the adhesive can be reduced to 50 μm or less, the first collimator 2 and the second collimator 3 can be more easily fixed, and the reliability of optical coupling can be further improved.

Figure 11:
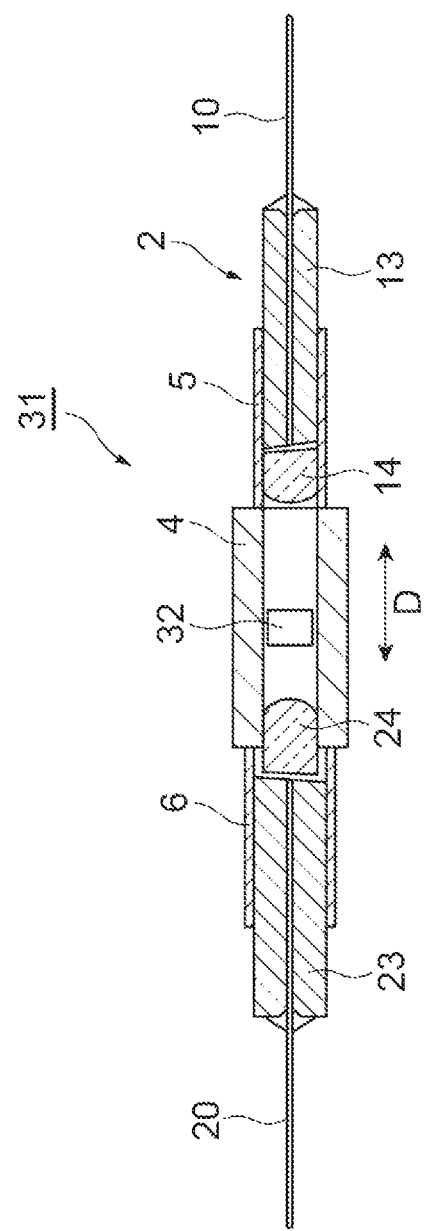
FIG. 11 is a cross-sectional view illustrating an optical fiber connection structure according to a modified example.

Next, various modified examples of the optical fiber connection structure is described. FIG. 11 is a cross-sectional view illustrating an optical fiber connection structure 31 according to a modified example. A portion of a configuration of the optical fiber connection structure 31 is the same as a portion of the configuration of the optical fiber connection structure 1 described above. Therefore, in the following, the description of the optical fiber connection structure 1 and duplicate description are omitted as appropriate with the same reference numerals denoted. In the optical fiber connection structure 31, an optical functional component 32 is arranged inside the tubular member 4. As an example, the optical functional component 32 is a Faraday element. In this case, the optical fiber connection structure 31 can function as an optical isolator.

Figure 12:
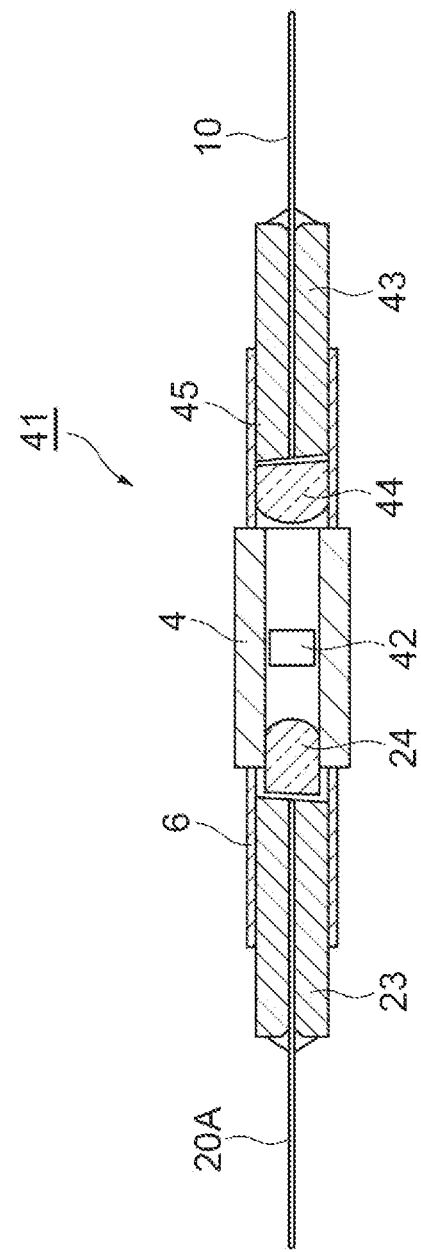
FIG. 12 is a cross-sectional view illustrating an optical fiber connection structure according to another modified example.

FIG. 12 is a cross-sectional view illustrating an optical fiber connection structure 41 according to a modified example different from that of FIG. 11. In the optical fiber connection structure 1 of FIG. 2 described above, the outer diameter of the first ferrule 13 is different from that of the second ferrule 23 and is smaller than that of the second ferrule 23. On the other hand, the optical fiber connection structure 41 illustrated in FIG. 12 includes a first ferrule 43 having an outer diameter substantially the same as the outer diameter of the second ferrule 23, a first lens 44, and a first sleeve 45 instead of the first ferrule 13, the first lens 14 and the first sleeve 5 described above. An inner diameter of the first sleeve 45 is larger than that of the tubular member 4. An outer diameter of the first lens 44 is larger than the inner diameter of the tubular member 4 and the outer diameter of the second lens 24.

The second ferrule 23 terminates two cores of a second optical fiber 20A instead of the above-mentioned second optical fiber 20. It is noted that, in FIG. 12, for simplification, the illustration of the two-core state is omitted. Further, an optical functional component 42 is arranged inside the tubular member 4. The optical functional component 42 is, for example, a WDM filter. In this case, the optical fiber connection structure 41 can be used as a WDM multiplexing/demultiplexing device. It is noted that, in the above, the example in which the second fiber is the two-core second optical fiber 20A is illustrated. However, one of the first optical fiber and the second optical fiber may be a two-core optical fiber, and for example, the first optical fiber 10 may be a two-core optical fiber.

Figure 13:
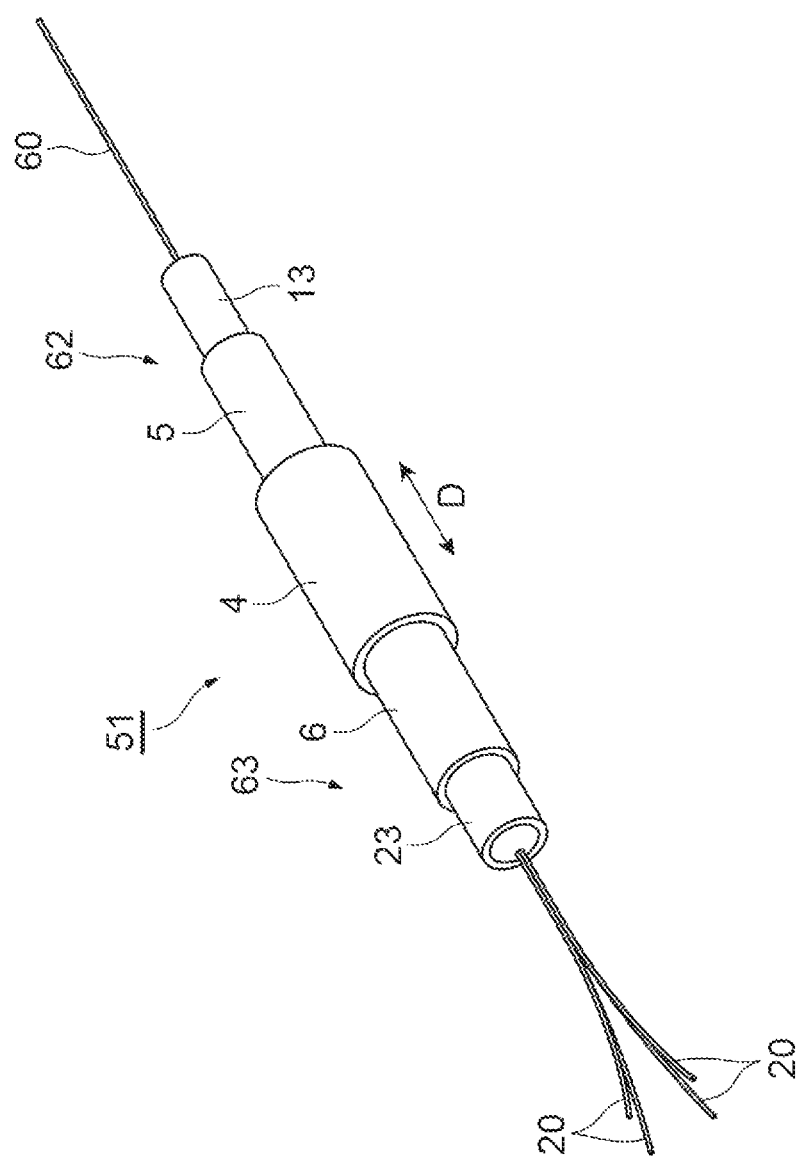
FIG. 13 is a perspective view illustrating an optical fiber connection structure according to still another modified example.
Figure 14:
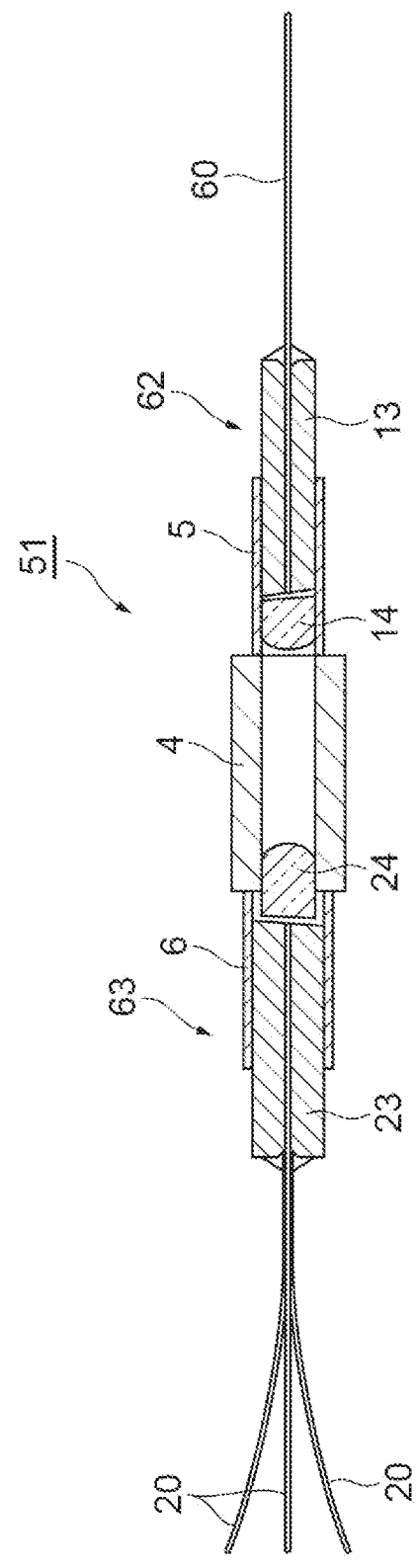
FIG. 14 is a cross-sectional view illustrating an optical fiber connection structure according to further still another modified example.

FIG. 13 is a perspective view illustrating an optical fiber connection structure 51 according to another modified example. FIG. 14 is a cross-sectional view illustrating the optical fiber connection structure 51. As illustrated in FIGS. 13 and 14, the optical fiber connection structure 51 includes a first collimator 62, a second collimator 63, and a tubular member 4. In the first collimator 62, the first ferrule 13 terminates a multi-core fiber 60, and in the second collimator 63, the second ferrule 23 retains a plurality of single-core fibers 65.

Figure 15:
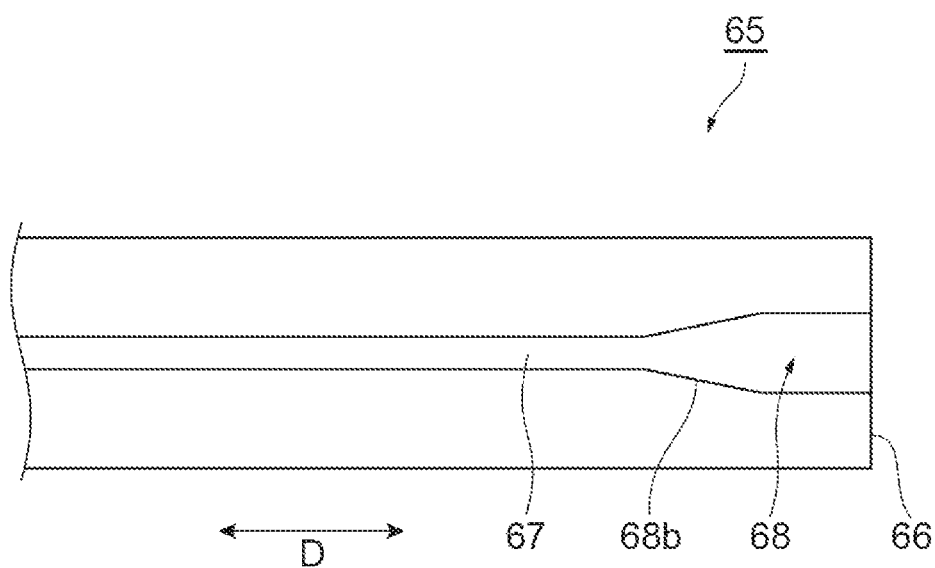
FIG. 15 is a diagram illustrating an example of a single-core fiber.

As illustrated in FIG. 15, for example, the single-core fiber 65 is a thermally expanded core (TEC) fiber. The single-core fiber 65 has, for example, a beam expansion portion 68 capable of expanding the mode field diameter of a light beam propagating through a core 67. The beam expansion portion 68 is, for example, the core expansion portion in which the core diameter of the core 67 is expanded on an end face 66 facing the second lens 24. For example, the beam expansion portion 68 includes a tapered portion 68b in which the core 67 is expanded to be the tapered shape. In this case, since the core 67 is expanded in the end face 66, a mode field diameter of a light beam propagating in the single-core fiber is expanded on the beam expansion portion 68 in the direction perpendicular to the axial direction D.

As described above, in the optical fiber connection structure 51 according to the modified example, the first optical fiber is the multi-core fiber 60, and the second optical fiber is the plurality of single-core fibers 65. Each of the plurality of single-core fibers 65 has the beam expansion portion 68 capable of expanding the mode field diameter of the light beam propagating in the core 67 of the single-core fiber 65. Therefore, the optical fiber connection structure 51 can be used as a fan-in/fan-out device for the multi-core fiber 60.

Figure 16:
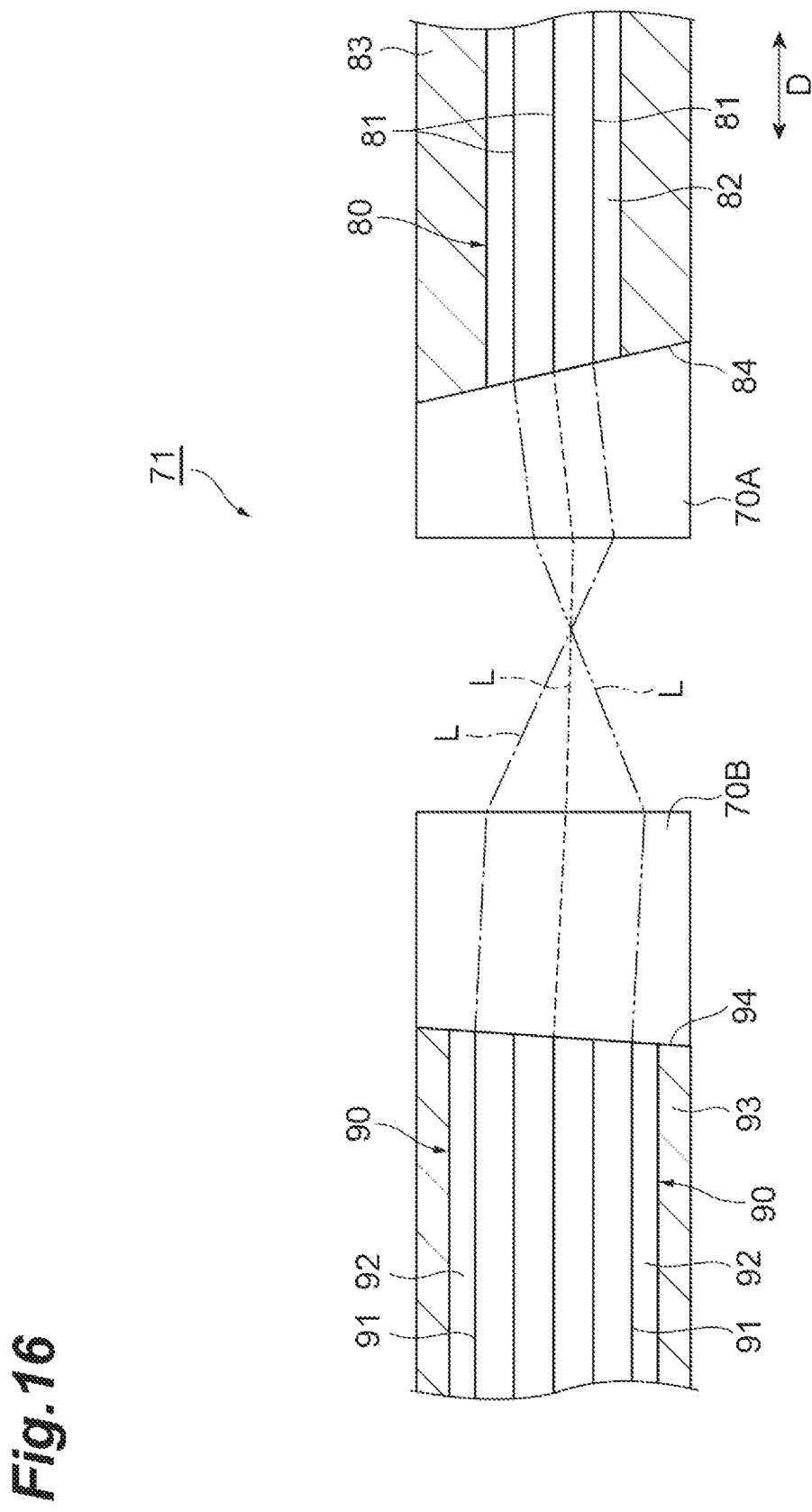
FIG. 16 is a cross-sectional view illustrating a ferrule and a lens of an optical fiber connection structure according to yet another modified example.

FIG. 16 is a cross-sectional view illustrating an optical fiber connection structure 71 according to still another modified example. As illustrated in FIG. 16, the optical fiber connection structure 71 constitutes, for example, a fan-in/fan-out device (FIFO) of the lens-coupled multi-core fiber. The optical fiber connection structure 71 includes a multi-core fiber 80, a plurality of single-core fibers 90, a first lens 70A interposed between the multi-core fiber 80 and the plurality of single-core fibers 90, and a second lens 70B interposed between the plurality of single-core fibers 90 and the first lens 70A.

The multi-core fiber 80 has a plurality of cores 81 and a cladding 82, and each single-core fiber 90 has a core 91 and a cladding 92. It is noted that, in FIG. 16, for simplification, the core 81 and the core 91 are illustrated in the line. The plurality of single-core fibers 90 are bundled in a second ferrule 93. The multi-core fiber 80 is terminated by a first ferrule 83. The multi-core fiber 80 has a first end face 84 facing the first lens 70A. For example, the first end face 84 has a flat space and is inclined with respect to the plane perpendicular to the axial direction D. Each single-core fiber 90 has a second end face 94 facing the second lens 70B. Similarly to the first end face 84, the second end face 94 has a flat shape and is inclined with respect to the plane perpendicular to the axial direction D.

The first lens 70A is arranged at the position facing the multi-core fiber 80 along the axial direction D. The first lens 70A collects the plurality of light beams L output from the plurality of cores 81 of the multi-core fiber 80 on the side opposite the multi-core fiber 80. The second lens 70B is arranged at the position facing the single-core fiber 90 along the axial direction D.

Each of the first lens 70A and the second lens 70B is a GRIN lens. For example, the second lens 70B may be the GRIN lens that function as a beam expansion portion. Antireflection (AR) coating may be applied between the first lens 70A and the first end face 84, and a minute empty gap may be provided. Further, the adhesive (as an example, a gel-like material) may be interposed between the first lens 70A and the first end face 84. The same applies to the space between the second lens 70B and the second end face 94. As described above, in FIG. 16, the example in which the first lens 70A and the second lens 70B are the GRIN lenses is described. However, at least one of the first lens 70A and the second lens 70B may be the GRIN lens. As described above, the GRIN lenses as the first lens and the second lens can be also used.

The embodiments and modified examples of the optical fiber connection structure according to the present disclosure have been described above. However, the present invention is not limited to the above-described embodiment or modified example. That is, it is easily recognized by those skilled in the art that the present invention can be modified and changed in various forms within the scope of the spirit described in the claims. For example, a shape, size, material, number, and arrangement of each component of the optical fiber connection structure can be changed as appropriate within the scope of the spirit.

REFERENCE SIGNS LIST 1, 31, 41, 51, 71: optical fiber connection structure, 2, 62: first collimator, 3, 63: second collimator, 4: tubular member, 4b: first end, 4c: second end, 5, 45: first sleeve, 5b: end face, 6: second sleeve, 6b: end face, 10: first optical fiber, 13, 43, 83: first ferrule, 13b: first ferrule end face, 14, 44, 70A: first lens, 14b: first lens end face, 14c: end face, 20, 20A: second optical fiber, 23, 93: second ferrule, 23b: second ferrule end face, 24, 70B: second lens, 24b: second lens end face, 24c: end face, 32, 42: optical functional component, 60, 80: multi-core fiber (first optical fiber), 65, 90: single-core fiber (second optical fiber), 66: end face, 67: core, 68: beam expansion portion, 68b: tapered portion, 81: core, 82: cladding, 84: first end face, 91: core, 92: cladding, 94: second end face, D: axial direction, L: light beam, M: mirror, P: pinhole jig, P1: insertion portion, P2: flange portion, P3: through-hole, S1, S2: gap, S2: gap.

The invention claimed is:

1. An optical fiber connection structure, comprising:
a tubular member;
a first collimator attached to a first end in an axial direction, which is a direction in which an axial line of the tubular member extends; and
a second collimator attached to a second end on a side opposite to the first end of the tubular member,
wherein the first collimator includes a first optical fiber, a first ferrule terminating the first optical fiber, a first lens facing the first ferrule through a gap, and a first sleeve internally holding the first lens and the first ferrule,
wherein the second collimator includes a second optical fiber, a second ferrule terminating the second optical fiber, a second lens facing the second ferrule through a gap, and a second sleeve internally holding the second lens and the second ferrule,
wherein an outer face of the first ferrule and an inner face of the first sleeve are fixed to each other via adhesive, an outer face of the first lens and the inner face of the first sleeve are fixed to each other via adhesive, an outer face of the second lens and an inner face of the tubular member are fixed to each other via adhesive, and an outer face of the second ferrule and an inner face of the second sleeve are fixed to each other via adhesive,
wherein the first sleeve is fixed to the first end in a state where the first lens faces the tubular member, and the second sleeve is fixed to the second end in a state where the second lens enters the tubular member, and
wherein an outer diameter of the second ferrule is larger than that of the second lens.

2. The optical fiber connection structure according to claim 1, wherein an end portion of the first sleeve and the first end of the tubular member are fixed via adhesive, and an end portion of the second sleeve and the second end of the tubular member are fixed via adhesive.

3. The optical fiber connection structure according to claim 1,
wherein the first lens has a first lens end face facing the first ferrule,
wherein the first ferrule has a first ferrule end face facing the first lens,
wherein an inclination angle of the first lens end face with respect to a plane perpendicular to an axial direction is different from an inclination angle of the first ferrule end face with respect to the plane perpendicular to the axial direction, and
wherein a light beam is output from the first lens toward the second lens along the axial direction.

4. The optical fiber connection structure according to claim 1,
wherein the second lens has a second lens end face facing the second ferrule,
wherein the second ferrule has a second ferrule end face facing the second lens,
wherein an inclination angle of the second lens end face with respect to a plane perpendicular to an axial direction is different from an inclination angle of the second ferrule end face with respect to the plane perpendicular to the axial direction, and
wherein a light beam is output from the second lens toward the first lens along the axial direction.

5. The optical fiber connection structure according to claim 1, wherein an end face of the first lens facing the tubular member enters an inside of the first sleeve rather than an end face of the first sleeve facing the tubular member.

6. The optical fiber connection structure according to claim 1, wherein at least one of the end face of the first lens facing the tubular member and the end face of the second lens being entering the tubular member has a spherical shape.

7. The optical fiber connection structure according to claim 1, wherein at least one of the first lens and the second lens is a GRIN lens.

8. The optical fiber connection structure according to claim 1, comprising a Faraday element arranged inside the tubular member.

9. The optical fiber connection structure according to claim 1,
wherein the first optical fiber is a multi-core fiber,
wherein the second optical fiber is a plurality of single-core fibers, and
wherein each of the plurality of single-core fibers has a beam expansion portion capable of expanding a mode field diameter of a light beam propagating in a core of the single-core fiber.

10. The optical fiber connection structure according to claim 1,
wherein any one of the first optical fiber and the second optical fiber is a two-core optical fiber, and
wherein a WDM filter is arranged inside the tubular member.

11. The optical fiber connection structure according to claim 1, wherein a maximum thickness of the adhesive is 50 µm or less.

* * * * *